J. C. BARKER.
OUTER COVER OF PNEUMATIC TIRES.
APPLICATION FILED NOV. 5, 1910.

1,004,344.

Patented Sept. 26, 1911.

UNITED STATES PATENT OFFICE.

JOHN CHARLES BARKER, OF LEEDS, ENGLAND.

OUTER COVER OF PNEUMATIC TIRES.

1,004,344.
Specification of Letters Patent.
Patented Sept. 26, 1911.

Application filed November 5, 1910. Serial No. 590,833.

*To all whom it may concern:*

Be it known that I, JOHN CHARLES BARKER, a subject of the King of Great Britain and Ireland, residing at Leeds, in the county of York, England, have invented certain new and useful Improvements in the Outer Covers of Pneumatic Tires; and I do hereby declare the following to be a full, clear, and exact description of the invention, such as will enable others skilled in the art to which it appertains to make and use the same.

This invention relates to the formation of raised portions on the tread surface of the outer covers of pneumatic tires, with the object of insuring a better grip on the road both for propulsion of the vehicle and for preventing side slipping.

This invention is hereunder described with reference to the accompanying drawing, in which—

Figure 2:
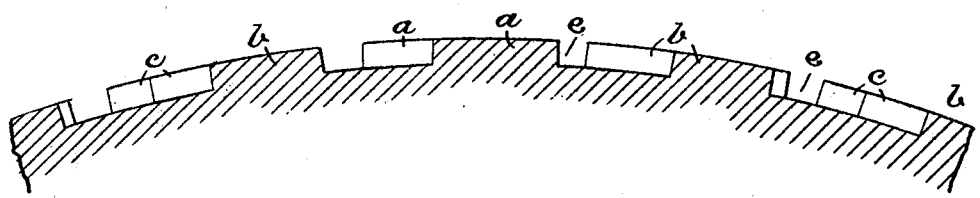
Figure 1:
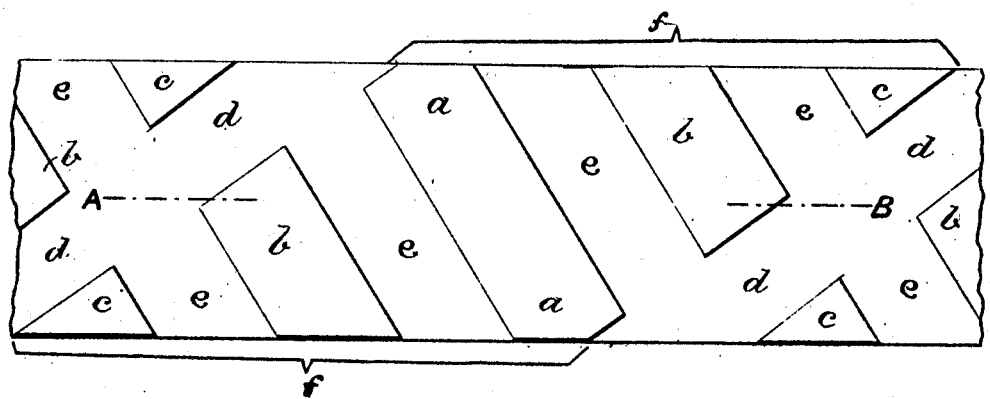

Figure 1 is a view of part of the tread surface of the outer cover of a pnuematic tire, and Fig. 2 is a section on line A B of Fig. 1.

As the invention is applicable to any of the usual kinds of outer covers for pneumatic tires, a cross section of the cover is omitted.

According to this invention the tread surface is divided by recesses or grooves *d* into a series of rhomboidal raised sections as indicated by the braces *f f*, each of which latter is divided by the grooves or recesses *e* into, a larger raised part *a*, two smaller raised parts *c* and two lettered *b* intermediate in size. The direction of the recesses *d* makes an angle of about 37 degrees with the side of the tire, and that of the recesses *e* of about 50 degrees with the side of the tire. The width of both the recesses and projections is roughly one third the tread width of the tire. The outside corners of the rectangle formed by the larger projections are cut off by the sides of the tread. There are thus no angular corners directed outward, only flat broad surfaces, which offer a more effectual resistance to side slipping, while the recesses *d* and *e* offer a relatively large space for the escape of wet and greasy material between them, enabling the edges of both the longer and the shorter of the projections on the side toward which slipping is taking place, to bite more readily on the underlying firmer ground. The elongated rhomboidal form of the sections into which the tire is divided, as above described, coupled with the relatively large width of the projections and recesses, destroys the close uniformity produced by more regular geometrical patterns of projections and grooves; in which the latter are more liable to be clogged up with material tightly embedded in the recesses, especially where these have no outlet. This will be evident on comparing the supporting surface offered in the neighborhood of the small triangular projections *c* and that offered about the approximately rectangular projections *a*. This deviation from close uniformity thus enhances the gripping power of the wheel for propulsion of the car. The device offers the same resistance to slipping toward both sides of the tire.

I am aware that recesses or grooves in the tread portion of the outer cover of pneumatic tires running diagonally in opposite directions across the tread have previously been used for increasing the grip on the road and preventing side slipping, I therefore make no general claim to such, but What I do claim is:—

1. A pneumatic tire provided with an outer cover having a tread portion constructed of a series of rhomboidal raised sections, integral with the tire, each divided by grooves into a larger raised part forming an approximately rectangular projection with the outer opposite corners cut off; two smaller triangular projections, and two intermediate sized projections having a truncated rectangular shape; the width of the projections being roughly one third the width of the tread surface of the tire, the projections and also said rhomboidal sections being separated from each other by grooves approximately of the same width as the projections.

2. The combination to form the tread portion of the outer cover of a pneumatic tire of a series of projections separated by two series of grooves of approximately the same width as the projections, running slantwise completely across the tread of the tire in opposite directions; the one series at an angle of about 37 degrees with the sides of the tire, the circumferential pitch of the same being about two and one half times the width of the tread portion of the tire; and the other series at an angle of about 55 degrees to the sides of the tire with a circumferential pitch about five sixths the width of the tire.

3. A tire having a tread comprising two series of grooves crossing each other and a series of intervening raised parts, some of which extend obliquely across the tread at regular intervals having the form of elongated rectangular parallelograms with two of their corners cut off by the borders of the tread, the intervening projecting parts having the forms of lesser fragments of a rectangle cut at different points by said borders.

In testimony whereof, I have signed my name to this specification in the presence of two subscribing witnesses.

JOHN CHARLES BARKER.

Witnesses:
J. CLARK JEFFERSON,
WM. S. EDMONDSON.